(12) United States Patent
Wang et al.

(10) Patent No.: US 10,845,253 B2
(45) Date of Patent: Nov. 24, 2020

(54) TURBINE THERMAL MONITORING SYSTEMS AND METHODS

(71) Applicant: General Electric Company, Schenectady, NY (US)

(72) Inventors: Guanghua Wang, Clifton Park, NY (US); Xiaoyue Liu, Clifton Park, NY (US); Bernard Patrick Bewlay, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 338 days.

(21) Appl. No.: 15/943,332

(22) Filed: Apr. 2, 2018

(65) Prior Publication Data

US 2019/0301945 A1    Oct. 3, 2019

(51) Int. Cl.
| | |
|---|---|
| G01K 1/08 | (2006.01) |
| G01K 1/14 | (2006.01) |
| G01K 13/00 | (2006.01) |
| G01J 5/00 | (2006.01) |
| G01K 11/12 | (2006.01) |
| G01L 1/24 | (2006.01) |
| F01D 25/12 | (2006.01) |
| F02C 9/28 | (2006.01) |

(52) U.S. Cl.
CPC ............ *G01K 1/143* (2013.01); *F01D 25/12* (2013.01); *F02C 9/28* (2013.01); *G01K 11/12* (2013.01); *G01L 1/248* (2013.01); *F05D 2270/303* (2013.01); *F05D 2270/8041* (2013.01)

(58) Field of Classification Search
USPC ....... 374/130, 208, 141, 144, 121, 148, 124, 374/143
See application file for complete search history.

(56) References Cited

U.S. PATENT DOCUMENTS

| | | | | |
|---|---|---|---|---|
| 5,226,731 | A | * | 7/1993 | Allen ............... F01D 17/085 356/43 |
| 8,184,151 | B2 | | 5/2012 | Zombo et al. |
| 8,292,501 | B1 | * | 10/2012 | Stein ............... G01J 5/0859 374/153 |
| 8,967,858 | B2 | * | 3/2015 | Foiret .............. G01K 7/026 374/144 |
| 9,015,002 | B2 | | 4/2015 | Zombo et al. |
| 9,182,318 | B2 | | 11/2015 | McCaldon |
| 9,230,055 | B2 | | 1/2016 | Clark et al. |
| 9,509,923 | B2 | | 11/2016 | Pandey et al. |
| 2004/0101023 | A1 | * | 5/2004 | Choi ............... G01J 5/0022 374/141 |

(Continued)

OTHER PUBLICATIONS

Schulz, A.; "Infrared thermography as applied to film cooling of gas turbine components", Measurement Science and Technology, vol. 11, Issue: 7, pp. 948-956, 2000.

(Continued)

*Primary Examiner* — Mirellys Jagan
(74) *Attorney, Agent, or Firm* — Fletcher Yoder, P.C.

(57) ABSTRACT

A gas turbine engine includes a core engine having a casing, a cowl disposed annularly around the casing such that a gap is formed between the casing and the cowl, and a thermal monitoring system having at least one camera positioned within the gap, wherein the at least one camera is configured to detect thermal radiation from at least one turbine component within the gap.

20 Claims, 7 Drawing Sheets

(56) References Cited

U.S. PATENT DOCUMENTS

| | | | |
|---|---|---|---|
| 2009/0297336 A1 | 12/2009 | Allen et al. | |
| 2012/0050537 A1* | 3/2012 | Ringermacher | G01J 5/0896 |
| | | | 348/164 |
| 2012/0113317 A1* | 5/2012 | Anderson | H04N 5/2252 |
| | | | 348/373 |
| 2012/0170611 A1* | 7/2012 | Wang | G01J 5/60 |
| | | | 374/121 |
| 2012/0194667 A1* | 8/2012 | Banerjee | G01J 5/0088 |
| | | | 348/135 |
| 2013/0167554 A1* | 7/2013 | Parsons | G01K 1/12 |
| | | | 60/803 |
| 2014/0254631 A1* | 9/2014 | Slavens | G01K 13/02 |
| | | | 374/208 |
| 2015/0176502 A1 | 6/2015 | Slavens, Jr. et al. | |
| 2015/0292976 A1* | 10/2015 | Xu | G01M 3/002 |
| | | | 348/82 |
| 2016/0153842 A1 | 6/2016 | Cheverton et al. | |
| 2018/0348070 A1* | 12/2018 | Wang | G01K 1/12 |

OTHER PUBLICATIONS

Astarita, T., et al.; "Some Experimental Investigations on Gas Turbine Cooling Performed with Infrared Thermography at Federico II", International Journal of Rotating Machinery, vol. 2015, pp. 16, 2015.

* cited by examiner

TURBINE THERMAL MONITORING SYSTEMS AND METHODS

BACKGROUND

The subject matter disclosed herein generally relates to thermal monitoring of gas turbine engines, and more specifically, to determining thermal maps and adaptive cooling of a gas turbine engine.

Typical gas turbine engines may include a turbine casing disposed about hot gas components such as, for example, a combustor and a turbine rotor of the gas turbine engine. The turbine casing may be a pressure vessel configured to facilitate pressurized fluid flow therethrough. A cowl (e.g., inner cowl) may be disposed about the casing, and a cowling (e.g., outer cowling) may be disposed about the cowl. In some embodiments, the cowl and the cowling may be coupled together. The inner cowl and the outer cowling may include streamlined surfaces to facilitate fluid flow (e.g., a fan flow) between the inner cowl and the outer cowling, and a fluid flow (e.g., an ambient or external air flow) along an outside surface of the outer cowling.

In certain embodiments, a cavity (e.g., an annular cavity) may extend between the casing and the cowl (e.g., inner cowl). Certain turbine components (e.g., under-cowl components) may be disposed within the annular cavity. Hot fluids flowing radially inward from the casing may radiate heat outwardly toward the casing, the annular gap, and the cowl. The high temperatures in the annular cavity between the cowl and the casing may place an undesirable thermal load on the under-cowl components, which may reduce an operating life of these components. For example, hot spots (e.g., singularities of abnormally high temperature) may develop adjacent to certain of the under-cowl components, which may cause these components to incur wear or damage (e.g., at a faster rate than other components). Accordingly, improved thermal monitoring and management of turbine components is desired.

BRIEF DESCRIPTION

In one embodiment, a gas turbine engine includes a core engine having a casing, a cowl disposed annularly around the casing such that a gap is formed between the casing and the cowl, and a thermal monitoring system having at least one camera positioned within the gap, wherein the at least one camera is configured to detect thermal radiation from at least one turbine component within the gap.

In another embodiment, a method of monitoring a thermal distribution in a turbine system includes measuring, via one or more infrared (IR) cameras, thermal radiation from under-cowl components disposed in a cavity between a casing of the turbine system and a cowl of the turbine system. The method also includes converting, via the controller, the data indicative of the measured thermal radiation of the under-cowl components into a surface temperature measurement of the under-cowl components. The method also includes generating, via a controller and based on the surface temperature measurement of the under-cowl components, a temperature map of the cavity and under-cowl components.

In another embodiment, an in situ thermal monitoring system of a turbine engine includes two or more infrared (IR) cameras configured to detect thermal radiation of turbine components. The in situ thermal monitoring system also includes at least one processor configured to receive data from the two or more IR cameras indicative of the thermal radiation of the turbine components, to convert the data indicative of the thermal radiation into downstream data indicative of surface temperatures of the turbine components, and to analyze the downstream data to generate a temperature map illustrating the surface temperature of the turbine components.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Typical gas turbine engines may include a turbine casing that extends along a length of the gas turbine engine, forming one or more fluid passageways therein. The turbine casing may encapsulate certain turbine components, and may serve as a pressure vessel with respect to the fluids flowing therethrough. A cowl (e.g., inner cowl) may be disposed around the casing such that a cavity (e.g., annular cavity, gap, annular gap) is disposed between the cowl and the casing. Under-cowl components may be disposed in the annular gap between the cowl and the casing. An outer cowling may be disposed radially outward from the cowl, and about the inner cowl. A fan flow path may be formed between the outer cowling and the inner cowl, where cooler air from the fan flows there through. The outer cowling and the inner cowl may include certain streamlines surfaces configured to enhance aerodynamics of the engine. For example, the outer cowling may include a smooth radially inward surface, and the inner cowl may include a smooth radially outer surface, to facilitate improved fan air flow therebetween. The outer cowling may also include a smooth radially outward surface, which facilitates streamlines flow of ambient or external air thereover. The outer cowling and/or the inner cowl may also protect the under-cowl components from damage by external forces.

The casing may operate, at least in part, to separate the above-described under-cowl cavity (and under-cowl components therein) from the hot gas path positioned radially inward from the cowl and under-cowl cavity. However, as described in detail below, the heat emanating from the hot gas path may radiate outward into the cavity having the under-cowl components. Thus, the under-cowl components may by exposed to thermal loads, which may be transient and based on certain operating conditions, environmental conditions, and other factors.

More specifically, an oxidant may flow through an inlet or passage of the turbine casing and toward a compressor radially inward from the casing, where the compressor may be disposed near an upstream end portion (e.g., a compressor section) of the turbine engine. The compressor may compress the oxidant, and subsequently direct the compressed oxidant toward a combustor of the turbine. A fuel nozzle disposed within the combustor may inject a fuel into the compressed oxidant, such that the combustor may ignite and combust an oxidant-fuel mixture. Hot gases generated by the combustion process may be directed toward a turbine disposed within a downstream end portion (e.g., a turbine section) of the turbine engine. The hot gases may expand within the turbine section, which may induce rotation of the turbine. In some cases, the turbine may be coupled to the compressor via a common shaft, such that the turbine may power (e.g., rotate) the compressor.

As noted above, the compressor, the combustor, the turbine, and the corresponding fluids (e.g., compressed air, fuel, combustion gases, etc.) may generate heat which radiates radially outward, through the casing and into the cavity between the casing and the cowl. Thermal loads may be placed on the under-cowl components positioned between the shroud and the cowl. For example, the under-cowl components may include a Full Authority Digital Engine Control Unit ("FADEC"), Environmental Control System ("ECS") valves, piping, or any other components one of ordinary skill in the art would recognize are disposed in the cavity between the cowl and the casing.

In some cases, the transferred heat may be focused on or in local hot spots (e.g., singularities of above average temperature) within, or adjacent to certain of, the under-cowl components. In other words, the heat may not be distributed evenly to the under-cowl components. Further, the thermal response by the turbine may be transient, such that thermal loading changes depending on operating modes, operating conditions, environmental conditions, and other factors. Indeed, local hot spots may change based on operating conditions, environmental conditions, and/or other facts. That is, the thermal loading of under-cowl components may be unpredictable.

Uncontrolled thermally induced loads may cause creep, oxidation, wear, and thermal fatigue of the under-cowl components. Thus, in accordance with the present disclosure, it may be desirable to monitor the temperature of the under-cowl components accurately and/or in real-time, such that a thermal management system/architecture for the under-cowl components may be actuated, modified, or designed to handle the transient thermal responses (e.g., when a thermal abnormality or change is detected). In doing so, the thermal management system may be targeted at areas needing cooling the most, which improves an efficiency of the thermal management system, thereby reducing a cost of the thermal management system, improving a cooling of the under-cowl components, and improving performance of the turbine engine.

However, it may be difficult to measure temperature distributions across the under-cowl components accurately and in real-time, as noted above, due to tight spatial limitations within the gap/cavity radially inward from the cowl. Indeed, in traditional embodiments, computer simulation tools (e.g., computational fluid dynamics "CFD") may be implemented to simulate operation of the gas turbine engine, and to estimate a thermal distribution in the annular cavity adjacent the cowl. However, these computer simulation tools may be ill-equipped to model and identify thermal loads associated with certain under-cowl components, particularly during transient operating conditions of the gas turbine engine, such as during a take-off or landing environment of an aircraft. In other words, computer simulation tools may be ill-suited for modeling thermal responses with may be unpredictable and based on a multitude of factors not included in the computer simulation.

Further, in certain traditional embodiments, thermocouples may be used to measure a temperature of the under-cowl components. However, the thermocouple measurements may be indicative of a particular temperature associated with a contact point between the thermocouple and a particular component. For example, a thermocouple may measure a temperature of a discrete point of the particular component to which the thermocouple is physically coupled. Accordingly, it may be difficult to generate a continuous thermal distribution map across a number of different components, such as the under-cowl components disposed between the turbine shroud and the cowl of a gas turbine engine. While many thermocouples may be used in an attempt to generate a thermal map, the thermal map still will not be continuous, and the system may be more expensive, more space-consuming, more susceptible to failure, less accurate, or any combination thereof. Further, it may be difficult to detect local hotspots, especially those with transient responses that are dependent on operating conditions/modes. Further still, thermocouples may suffer from substantial delays (e.g., slow response time), making real-time observation/management of transient thermal events difficult and/or less accurate.

In view of the description above, embodiments of the present disclosure are directed toward systems and methods for monitoring temperature distributions across certain turbine components (e.g., the under-cowl components) using a thermal monitoring system having infrared (IR) cameras. Indeed, in accordance with present embodiments, the thermal monitoring system may include one or multiple IR cameras (e.g., micro-IR cameras) that may be used to generate a continuous thermal distribution map of a surface temperature of the under-cowl components (and surfaces of the cowl and the shroud, and other components), as described below.

An infrared camera (e.g., micro-IR camera) is a camera which detects infrared light/radiation having a wavelength within the range of approximately 700 nanometers and 14,000 nanometers. The micro-IR camera in accordance with certain embodiments may include a lens, a mirror, and an infrared sensor array at or inwards from the lens. The lens and/or mirror may focus waves from infrared energy onto the infrared sensor array, where the sensors of the sensor array detect the infrared energy and, based on the detected infrared energy, produce electronic signals indicative of the infrared energy. As described in greater detail herein, the micro-IR cameras may be communicatively coupled to a controller (e.g., coordinating controller) of the thermal monitoring system. A position and orientation of each micro-IR camera (and the corresponding sensors of the sensor array) may be received by the controller. In accordance with certain embodiments, the micro-IR cameras may be equipped with internal processors which convert the electronic signals, or directly convert the measurements of the detected infrared energy, into temperature measurements. Each micro-IR camera may, then, be capable of generating a temperature map of the area observed by the micro-IR camera. Thus, in such embodiments, the coordinating controller may be utilized to combine the individual temperature maps into a global map including several monitored areas of the under-cowl components and corresponding cavity. In other words, the coordinating controller may receive the data from the micro-IR cameras indicative of temperature distributions of individually monitored areas/components, and may generate a global temperature distribution map by taking into account the position and orientation of the micro-IR cameras.

In other embodiments, the coordinating controller may receive the electronic signals, indicative of infrared energy, determined by each micro-IR camera, and may convert the electronic signals into temperature distributions. In other words, it is presently contemplated in this disclosure that the processing from infrared detection to generating the global temperature distribution may be handled in part by the micro-IR cameras, in part by the coordinating controller, or any combination thereof. In general, by correlating the electronic signals with the position/orientation data of the micro-IR cameras, the micro-IR cameras and coordinating controller may generate a two-dimensional (2-D) or three-dimensional (3-D) temperature map showing the thermal loads on the under-cowl components and within the cavity extending radially between the aforementioned casing and the cowl (e.g., including surfaces of the casing and the cowl forming the cavity).

In some embodiments, the IR cameras may be substantially small (e.g., micro-IR camera), which may enable the micro-IR cameras to be disposed within spatially constrained areas of the gas turbine engine, such as within the annular cavity/gap between the turbine casing and the cowl. For example, each micro-IR camera (or outermost camera component, such as camera case) may include an outer casing having the following dimensions: between approximately 0.2 inches (in.) and 2 in. (5.1 millimeters [mm] to 51 mm) in length, approximately 0.2 in.-2 in. (5.1 millimeters [mm] to 51 mm) in width, and approximately 0.2 in. to 1.5 in. (5.1 millimeters [mm] to 51 mm) in height. In other words, an outer boundary of each camera unit may include the above-described dimensions. Accordingly, the micro-IR cameras may be disposed in situ, meaning the micro-IR cameras are disposed within the cavity and substantially adjacent to certain of the under-cowl components while the turbine engine is in operation. As such, the micro-IR cameras may have a physically unobstructed view of the under-cowl components during thermal loading. The micro-IR cameras may be positioned permanently within the cavity, or the micro-IR cameras may be removably disposed within the cavity. Further, positions and orientations of the micro-IR cameras may be adjustable, during operation of the turbine engine and/or while offline. Accordingly, the micro-IR cameras and corresponding controller may be used during any operating modes to generate a 2-D or 3-D temperature map of a portion or all of the annular cavity (and components therein) between the cowl and the casing.

Further to the points above, the micro-IR cameras may enable a relatively high sampling rate (e.g., a rate and/or a scale of data acquisition). Indeed, the thermal monitoring system may obtain and/or analyze thermal distributions of certain of the under-cowl components in a timeframe that is substantially close to the time of actual observation (e.g., in real-time). As such, the thermal distribution map generated by the thermal monitoring system may be used as a control feedback to a thermal management system, which may provide selective cooling to certain components in hot spots and/or having certain thermal loading fluctuations. In other words, the real-time monitoring capabilities facilitate real-time response (e.g., real-time cooling), where the real-time response may include certain control features which can provide more or less cooling to particular areas in the cavity/gap adjacent the cowl.

With respect to the selective cooling features described above, it should be noted that each micro-IR camera of the thermal monitoring system may be disposed within a respective camera case. The camera case may insulate the micro-IR cameras from a thermal environment of the annular cavity. For example, temperatures within the annular cavity may exceed 500 degrees Fahrenheit, which may reduce an operational life of the micro-IR cameras. In some cases, a flow of cooling fluid (e.g., cooling air) may be directed toward certain under-cowl components 66 and certain of the camera cases, in particular, camera cases disposed adjacent to a section of the gas turbine engine under relatively high thermal loads (e.g., as determined by the presently disclosed thermal monitoring system). In some embodiments, the camera case may be additively manufactured, which may enable geometry and materials of the camera case suitable for the high thermal loading within the cavity. These and other features will be described below with reference to the drawings.

Figure 1:
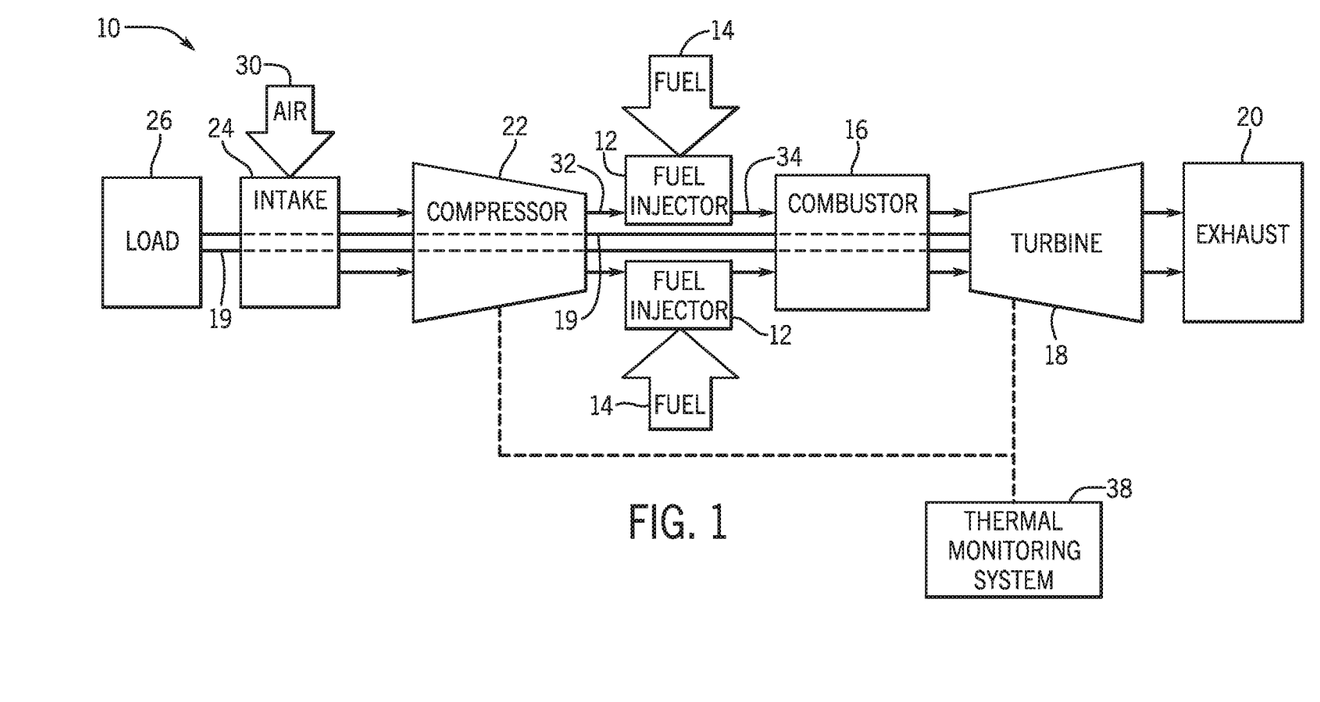
FIG. 1 is a schematic diagram of an embodiment of a gas turbine system having a thermal monitoring system, in accordance with an aspect of the present disclosure.

With the forgoing in mind, FIG. 1 illustrates a block diagram of a gas turbine system 10. The gas turbine system 10 includes a fuel injector 12, a fuel supply 14, a combustor 16, and a turbine 18. As illustrated, the fuel supply 14 routes a liquid fuel and/or gas fuel, such as natural gas, to the gas turbine system 10 through the fuel injector 12 and into the combustor 16. As discussed below, the fuel injector 12 is configured to inject and mix the fuel with compressed air. The combustor 16 ignites and combusts the fuel-air mixture, and then passes hot pressurized exhaust gas into the turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As described in greater detail herein, the gas turbine system 10 may include a thermal monitoring system 38 that determines a temperature (e.g., a surface temperature) of certain turbine components. For example, the thermal monitoring system 38 may be communicatively coupled to a plurality of cameras disposed about the gas turbine system 10, which may facilitate observation of a temperature distribution across the gas turbine system 10. In particular, and as described in detail with reference to later drawings, the thermal monitoring system 38 may include IR cameras (e.g., micro-IR cameras) disposed in an annular cavity radially inward from an inner cowl of the gas turbine system 10 and radially outward from a casing of the turbine, where the casing extends annularly about (or adjacent to), and/or includes, certain hot gas components of the gas turbine system 10. The cowl (e.g., inner cowl) extends radially about the casing, and a cowling (e.g., outer cowling) extends radially about the cowl. The IR cameras and a controller (e.g., coordinating controller) of the thermal monitoring system 38 may be disposed in the cavity between the turbine casing and inner cowl, as described above, and may interface with each other to generate a temperature map indicative of a thermal distribution within the cavity extending between the casing and the cowl. In some embodiments, the gas turbine system 10 may include a thermal management system having features that may be adaptable based on the temperature map. For example, the temperature map may be generated in real-time, and the thermal management system may be actuated to address a particular area experiencing high thermal loads. These and other features are described in detail below.

Figure 2:
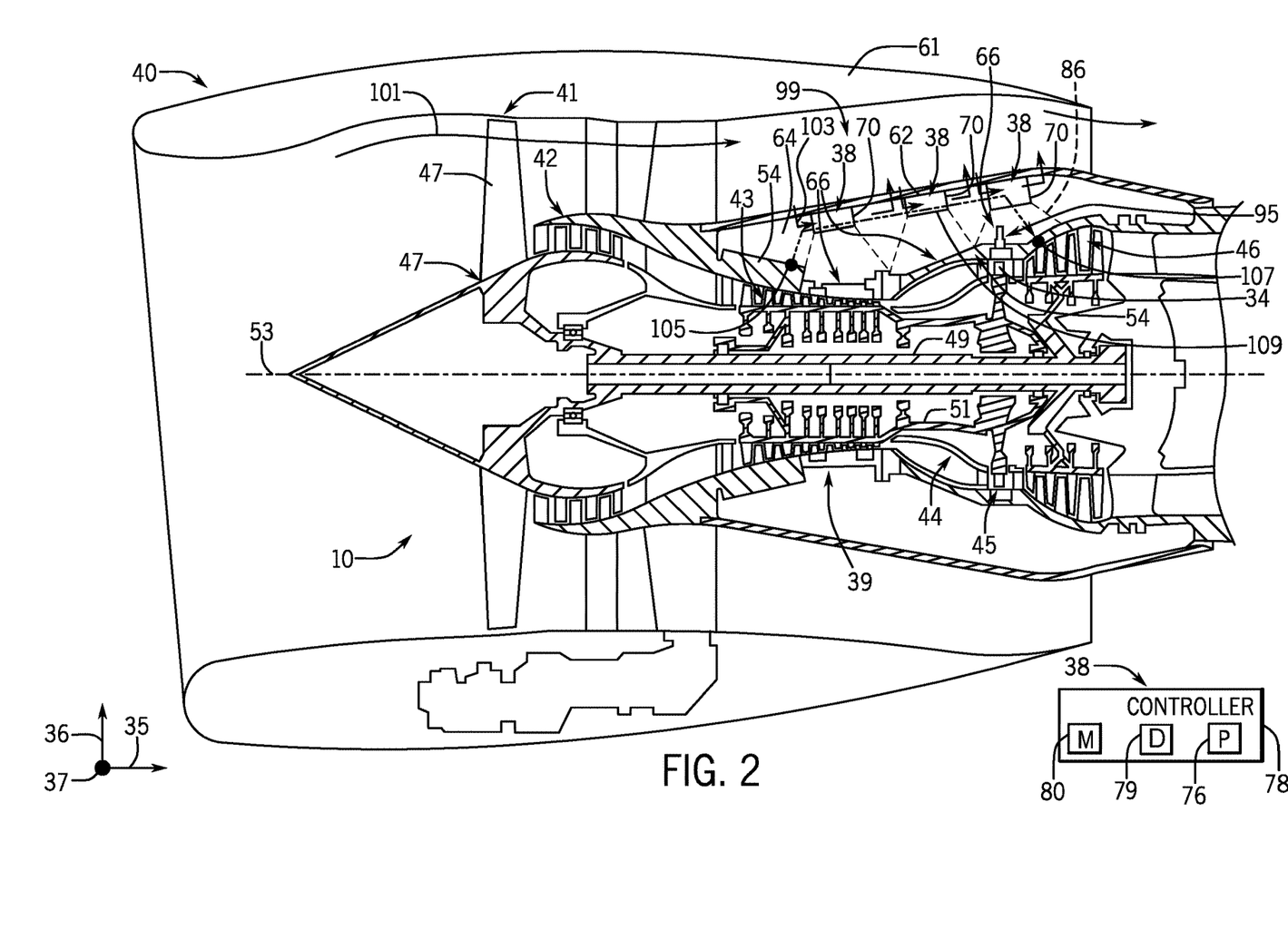
FIG. 2 is a cross-sectional schematic view of an embodiment of an aircraft turbine engine having the thermal monitoring system of FIG. 1, in accordance with an aspect of the present disclosure.

FIG. 2 illustrates a cross-sectional schematic view of an embodiment of a gas turbine engine 40 (e.g., an aero-derivative gas turbine engine). To facilitate discussion, the gas turbine engine 40 and its components may be described with reference to a longitudinal axis or direction 35, a first radial direction 36, and a second radial direction 37. The gas turbine engine 40 includes a fan assembly 41, and a core engine 39 having a low pressure compressor (LPC) 42, a high pressure compressor (HPC) 43, a combustor section 44, a high-pressure turbine (HPT) 45, and a low-pressure turbine (LPT) 46. The illustrated gas turbine engine 40 may be an example of the gas turbine system 10 illustrated in FIG. 1. In the illustrated embodiment, the fan assembly 41 of the gas turbine engine 40 (e.g., an aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the HPC 43 and the HPT 45 are coupled by a high-speed rotor shaft 51. The low-speed rotor shaft 49 and the high-speed rotor shaft 51 may each be concentric to an axial centerline 53 of the gas turbine engine 40.

The gas turbine engine 40 may be any type of gas or combustion turbine aircraft engine including, but not limited to, turbofan, turbojet, turboprop, turboshaft engines as well as geared turbine engines such as geared turbofans, un-ducted fans and open rotor configurations. Alternatively, the gas turbine engine 40 may be any type of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to the axial centerline 53 (e.g., along direction 35) that extends through the gas turbine engine 40, such that compressed air is supplied to the HPC 43. Certain of the air may be received by the LPC 42, and certain of the air may flow between a cowling 61 (e.g., outer cowling) of the gas turbine engine 40 and a cowl 62 (e.g., inner cowl) of the gas turbine engine 40. The cowling 61 and the cowl 62 may include smooth/streamlined surfaces to reduce a turbulence of an air flow therebetween. Further, an outer surface of the cowling 61 may be smooth/streamlined to reduce a turbulence of an ambient/environmental air flow there over.

The air received by the LPC 42 may be compressed by the LPC 42 and the HPC 43. The highly compressed air is then delivered to the combustor 44. Combustion gas flow (not shown) from the combustor 44 drives the HPT 45 and the LPT 46. The HPT 45 drives the HPC 43 by way of the high-speed rotor shaft 51, and the LPT 46 drives the fan assembly 41 by way of the low-speed rotor shaft 49.

In the illustrated embodiment, a casing 54 may extend annularly about the axial centerline 53, and may circumferentially surround portions of the LPC 42, the HPC 43, the combustor section 44, the HPT 45 and/or the LPT 46. The casing 54 may be a part of, or more surround a substantial part of, the core engine 39. The casing 54 may be a pressure vessel configured to facilitate pressurized fluid flow therethrough. For example, the casing 54 may include a single segment (e.g., metallic segment), or multiple segments (e.g., metallic segments) that are coupled to one another in a sealed arrangement. Accordingly, the casing 54 may form a hot gas passageway extending continuously through various components of the gas turbine engine 40. Since the casing 54 may surround the LPC 42, the HPC 43, the HPT 45, and/or the LPT 46, the casing 54 may be heated during operation of the gas turbine engine 40 by the hot gases passing through the fluid passageway. Further, an annular cavity 64 (or gap) between the cowl 62 and the casing 54 may be thermally loaded by heat emanating from the hot gas path within the casing 54.

As discussed above, certain turbine components, referred to as under-cowl components 66 (illustrated schematically in FIG. 2), may be disposed within the annular cavity 64. The cowl 62 may physically protect the under-cowl components 66, such as from air (and objects in the air) flowing across an exterior of the cowl 62 (e.g., between the cowl 62 and the outer cowling 61). As previously described, the thermal monitoring system 38 may include IR cameras 70 and a controller 78 configured to monitor a temperature of under-cowl components 66 within the annular cavity 64. As shown, the controller 78 may include a display 79 on which an output of the thermal monitoring system 38 can be displayed. It should be noted that "under-cowl components 66" includes surfaces of the casing 54, in addition to other under-cowl components 66 such as a Full Authority Digital Engine Control Unit ("FADEC"), Environmental Control System ("ECS") valves, piping, etc. While the above-described components are examples of the under-cowl components 66, it should be noted that any component disposed in the cavity 64 and/or between the cowl 62 and the casing 54 is considered one of the under-cowl components 66, including surfaces of the casing 54 and the cowl 62.

As discussed above, the thermal monitoring system 38 may include one or more infrared (IR) cameras 70 (e.g., micro-IR cameras), which may monitor thermal distributions across the under-cowl components 66 and within the cavity 64. The micro-IR cameras 70 (e.g., including corresponding camera cases) may be substantially small, which may enable positioning of the micro-IR cameras 70 within the annular cavity 64. For example, the micro-IR cameras 70 (e.g., including the camera case) may be between approximately 0.2 inches (in.)-2 in. in (5.1 millimeters [mm] to 51 mm) length, approximately 0.2 in.-2 in. (5.1 millimeters [mm] to 51 mm) in width, and approximately 0.2 in. to 2 in. (5.1 millimeters [mm] to 51 mm) in height. It should be noted that dimensions of the micro-IR cameras 70 are not limited to the foregoing example, and may include other suitable dimensions that may enable the micro-IR cameras 70 to be disposed within the annular cavity 64 between the casing 54 and the cowl 62. Accordingly, the micro-IR cameras 70 may be disposed in situ, and substantially adjacent to certain of the under-cowl component 66. "In situ," in accordance with the present disclosure, refers to the location of the micro-IR cameras 70 inside the cavity 64, and operating of the micro-IR cameras 70, while the gas turbine engine 40 is operating.

As discussed above, the micro-IR cameras 70 may measure, in particular, a surface temperature of the under-cowl components 66. For example, each of the micro-IR cameras 70 may include an array of detectors (e.g., sensor array) that may detect infrared energy/radiation (e.g., heat). The array of sensors of a particular micro-IR camera 70 may include an internal processor which converts the detected infrared waves (e.g., thermal radiation) into temperature measurements. Further, in some embodiments, the micro-IR camera 70 may be capable of generating a temperature map of the area monitored by the micro-IR camera 70, or at least data indicative of surface temperature measurements at particular location coordinates. That is, the micro-IR camera 70 or another processor may convert the data indicative of thermal radiation into downstream data indicative of surface temperatures. A global controller 78 may be communicatively coupled with the cameras 70, and may receive the data from the cameras 70. In certain embodiments, the global controller 78 may piece individual temperature maps (or data indicative of individual temperature maps) from corresponding cameras 70 into a single temperature map indicative of the thermal distribution within the cavity 64. However, it should be noted that, depending on the embodiment, the processing distribution between the micro-IR camera 70 and the global controller 78 may differ. Indeed, in certain embodiments, the micro-IR camera 70 may transmit to the global controller 78 electronic signals indicative of the detected infrared energy/light, and the global controller 78 may deduce from the electronic signals the temperature distribution. Further, processing of the location(s) and orientation(s) of the cameras 70 may be handled by the cameras 70 themselves, the global controller 78, or both.

As described in greater detail herein, the processor 76 (e.g., a microprocessor) may execute software, such as software for operating each of the micro-IR cameras 70 and/or analyzing the digital or analog signals generated by the micro-IR cameras 70. Moreover, the processor 76 may include multiple microprocessors, one or more "general-purpose" microprocessors, one or more special-purpose microprocessors, and/or one or more application specific integrated circuits (ASICS), or some combination thereof. For example, the processor 76 may include one or more reduced instruction set (RISC) processors.

Further, a memory device 80 of the global controller 78 may store certain information, such as thermal measurements acquired by each of the micro-IR cameras 70 and/or a time at which the thermal measurements were acquired. Indeed, the memory device 80 may include a volatile memory, such as random access memory (RAM), and/or a nonvolatile memory, such as read-only memory (ROM). The memory device 80 may store a variety of information and may be used for various purposes. For example, the memory device 80 may store processor-executable instructions (e.g., firmware or software) for the processor 76 execute, such as instructions for generating a surface temperature map of the under-cowl components 66. In some embodiments, the memory device 80 is a tangible, non-transitory, machine-readable-medium that may store machine-readable instructions for the processor 76 to execute. The memory device 80 may include ROM, flash memory, a hard drive, or any other suitable optical, magnetic, or solid-state storage medium, or a combination thereof. As noted above, in certain embodiments, the camera 70 itself may include a memory on which the camera's position/orientation information is stored, and data indicative of the positions/orientations of the cameras 70 may be transmitted by the cameras 70 to the global controller 78. Other distributions of processing and memory between the cameras 70 and the global controller 78 are also presently contemplated by this disclosure.

Each of the micro-IR cameras 70 may measure thermal distributions within a respective field of view 86, as shown in FIG. 2. The field of view 86 of a particular micro-IR camera 70 may detect temperatures along a surface area (e.g., an area of under-cowl components 66) in the cavity 64. The surface area captured by each camera 70 is dependent on a position and orientation of the camera 70, in addition to the field of view 86, where the field of view 86 may depend on the lens, the mirror, and the sensor array of the camera 70. In other words, the "field of view 86" of the camera 70, in accordance with the present disclosure, is constant, but the position/orientation of the camera 70 may determine an intersection between the field of view 86 and surfaces (e.g., under-cowl components 66) of the gas turbine engine 40, where the intersection is the area monitored by the camera 70. Each micro-IR camera 70 may include substantially similar lenses, mirrors, and sensor arrays to enable similar fields of view 86, or the cameras 70 may include different lenses, mirrors, and sensor arrans, enabling different fields of view 86. Thus, the network of cameras 70 included in the thermal monitoring system 38 may be utilized to capture thermal distribution across large and small under-cowl components 66, and of a portion or all of the cavity 64. As shown in the illustrated embodiment, the cameras 70 may be positioned such that the combined area monitored by the cameras 70 includes an entirety (or large portion) of the casing 64 and other under-cowl components 66 within the cavity/gap 64.

In some embodiments, one of the cameras 70 may be directed toward a component of interest 95. The component of interest 95 may be a component susceptible to high thermal loading, to thermal degradation, or both. Further, the component of interest 95 may change based on a life-span of each of the under-cowl components 66, an estimated thermal loading of the under-cowl components 66, or other factors. For example, the illustrated component of interest 95 may be one that is known to be approaching failure due to thermal fatigue. Thus, thermal monitoring (and/or subsequent cooling) may be more important to the component of interest 95 than certain other under-cowl components 66. As previously described, positions and orientations of the cameras 70 may be adjustable (e.g., during a maintenance of the gas turbine engine 40). Thus, when thermal monitoring of a particular component is desired, one of the cameras 70 may be positioned/oriented to ensure accurate monitoring of the component of interest 95.

As a non-limiting example, the component of interest 95 may include a Full Authority Digital Engine Control Units ("FADEC"), an Environmental Control System ("ECS") valve, piping, certain fasteners or retainers, or any other suitable turbine components. As described above, in some embodiments, the component of interest 95 may be selected based on previously determined (e.g., empirically determined, determined through computer simulation, etc.) temperature distributions across the under-cowl components 66, and one of the cameras 70 may be particular directed toward the component of interest 95. Another factor determining camera location/orientation includes the general layout of the under-cowl cavity 64 and under-cowl components 66. For example, in certain embodiments, one or more under-cowl components 66 may obstruct positioning of the cameras 70, but also may obstruct easy access for observing other under-cowl components 66. Thus, certain areas may include more or less cameras 70 based on space constraints and observation needs. Indeed, 1, 2, 3, 4, 5, 6, or more micro-IR cameras 70 may be used, and the distribution of the cameras 70 through the under-cowl cavity 64 may not be homogenous.

In addition the above-described features, the turbine engine 40 may include a system configured to cool components of the thermal monitoring system 38, namely, the IR cameras 70. The cameras 70 may be cooled via an air cooling sub-system, a fuel/oil cooling sub-system, or both. In the illustrated embodiment, as previously described, a fan flow path 99 is defined between the cowl 62 and the cowling 61. The fan blades 47 rotate to cause an air flow 101 through the air flow path 99. A portion 103 of the air flow 101 may be bled from the air flow 101 and routed through the cowl 62, into the camera(s) 70, back through the cowl, and into the air flow path 99.

The turbine engine 40 may additionally or alternatively include a fuel/oil cooling sub-system. As shown, the fuel/oil cooling sub-system may include an inlet 105, an outlet 107, and a closed loop 109 extending through the cameras 70 and between the inlet 105 and the outlet 107. The fuel/oil may be provided from the same fuel source as the combustor, or a different source.

Figure 3:
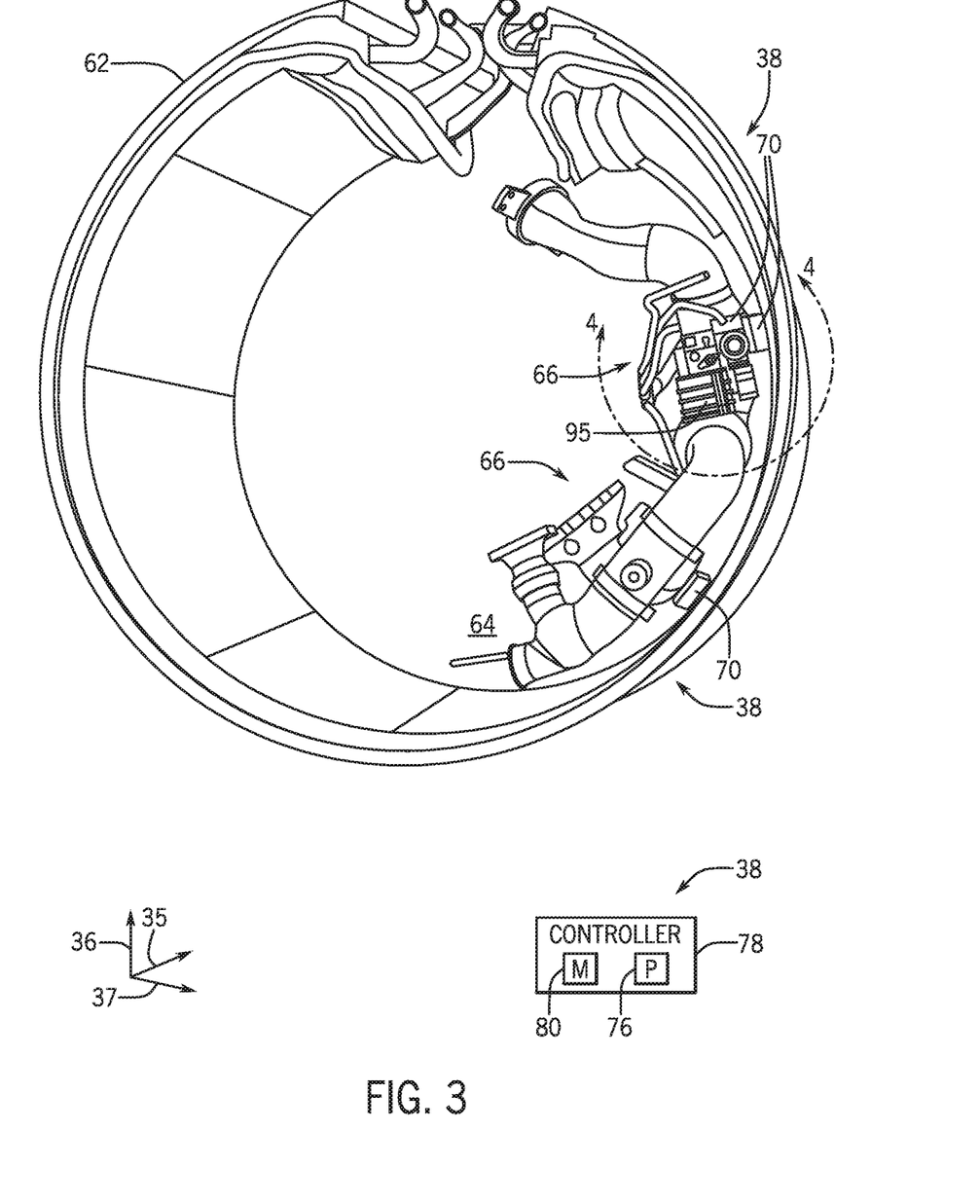
FIG. 3 is a perspective view of an embodiment of a cowl and under-cowl components, and the thermal monitoring system of FIG. 1, in accordance with an aspect of the present disclosure.

FIG. 3 is a perspective view of an embodiment of the cowl 62, the under-cowl components 66 disposed in the cavity 64, and the thermal monitoring system 38. Although not illustrated in this embodiment, a cowling may be disposed radially outward from the cowl 62, and a casing may be disposed radially inward from the cowl 62, where the casing may surround a hot gas path and corresponding components of the system. The cavity 64 is disposed between the cowl 62 and the casing (not shown), and the under-cowl components 66 are disposed in the cavity 64. As discussed above, the micro-IR cameras 70 of the thermal monitoring system 38 may be arranged to monitor a thermal distribution through various portions of the cavity 64. As previously noted, the cameras 70 may be communicatively coupled with the controller 78, which may output a temperature map based on the data received from the cameras 70.

Figure 4:
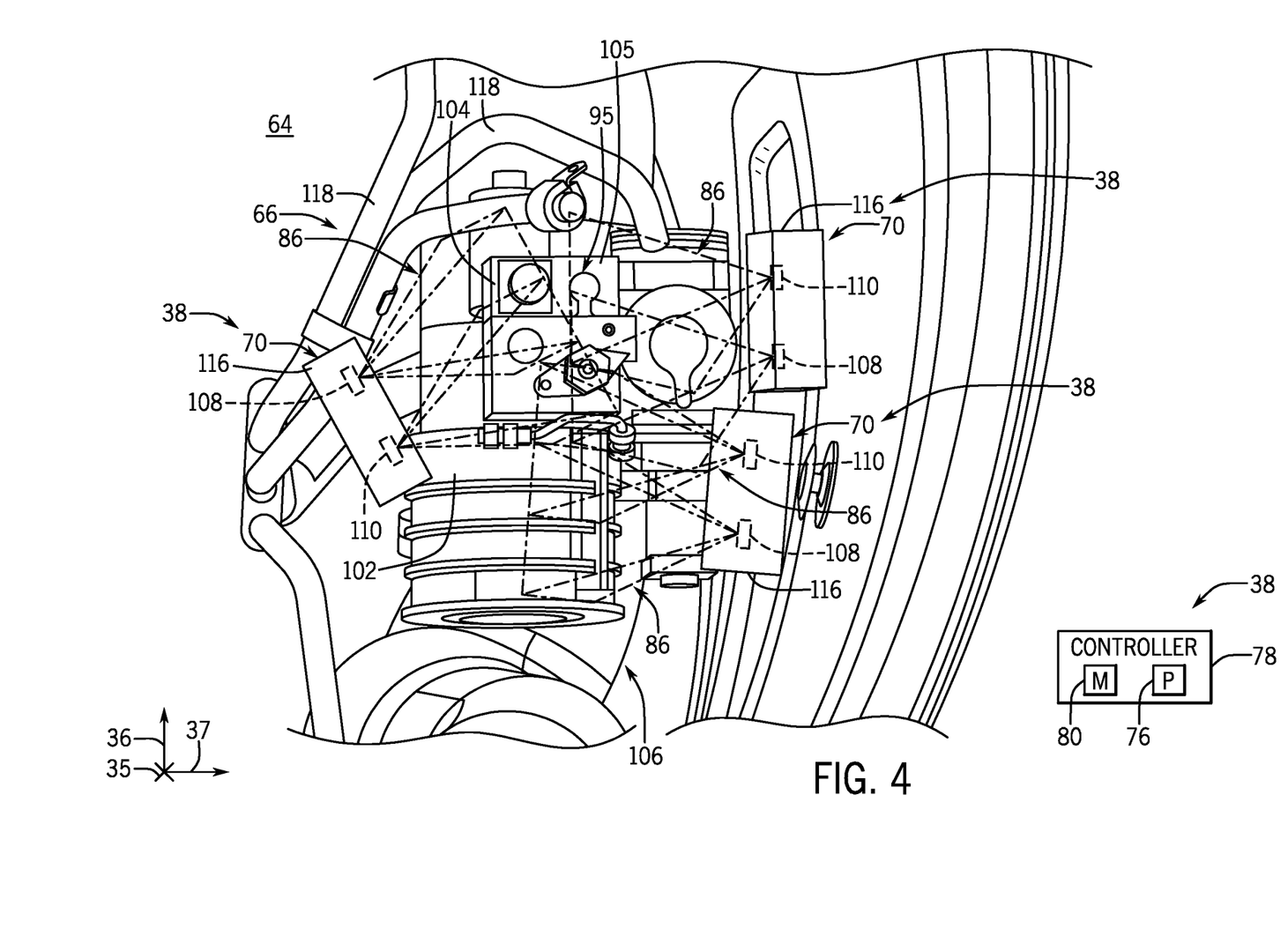
FIG. 4 is a close-up perspective view of the cowl, the under-cowl components, and the thermal monitoring system illustrated in FIG. 3, taken along line 4-4 of FIG. 3, in accordance with an aspect of the present disclosure.

For clarity, FIG. 4 illustrates a close-up perspective view, taken along line 4-4 in FIG. 3, of the cowl 62, the under-cowl components 66, and the thermal monitoring system 38 illustrated in FIG. 3. As previously described, the under-cowl components 66 may include the component of interest 95, and at least one of the micro-IR cameras 70 may be specifically or primarily directed to capture a thermal distribution of the component of interest 95. As discussed above, in some embodiments, the component of interest 95, or components of interest, may be selected based on previously acquired temperature data of certain of the under-cowl components 66. By way of non-limiting example, previous experimental tests (e.g., empirical tests, analyses using computational fluid dynamics) may indicate that a particular component of the under-cowl components 66, such as an Environmental Control System (ECS) valve 102, may experience abnormally large thermal loads during certain operating conditions. Accordingly, the ECS valve 102 may be selected as one of the component(s) of interest 95. Certain (or one) of the cameras 70 may be specifically targeted to the component of interest 95 (e.g., the ECS valve 102), such that the camera(s) 70 ensure the thermal monitoring system 38 generates a 2-D or 3-D surface temperature map of (or including) the component of interest 95. As discussed in greater detail herein, the temperature map may be used to detect and identify thermal variances across the component of interest 95 that may not otherwise be recognized using conventional thermal monitoring techniques. Indeed, traditional embodiments utilizing thermocouple may be unable to generate a continuous, accurate temperature map, and may suffer from sampling or signal delays. Traditional embodiments utilizing computer simulations may be inaccurate and unlikely to predict actual operating conditions.

In some embodiments, each of the micro-IR cameras 70 capturing the component of interest 95 may be oriented along a different direction with respect to the component of interest 95 (e.g., the ESC valve 102). For example, certain of the micro-IR cameras 70 may be oriented toward a first portion 104 of the component of interest 95, while certain of the micro-IR cameras 70 may be oriented toward a second portion 106 of the component of interest 95. In some cases, the fields of view 86 of the cameras 70 may overlap. Accordingly, the micro-IR cameras 70 may monitor all of the surface area(s) of the component of interest 95.

In some embodiments, each micro-IR camera 70 may include a first receptor 108 and a second receptor 110, which may each include an infrared sensor array configured to measure infrared waves (e.g., thermal radiation or heat). The first and second receptors 108, 110 may monitor thermal radiation from under-cowl components 66 within a first viewing area 86 and a second viewing area 86, respectively. Further, the camera case 116 may include opaque materials, but may include a window (or two windows) which accommodate the fields of view 86 of the first and second receptors 108. Accordingly, each of the micro-IR cameras 70 can see through the window(s), and may acquire a stereoscopic view of certain of the under-cowl components 66, such as the component of interest 95, which may facilitate a 3-D temperature/thermal distribution map. In other words, one or the network of micro-IR cameras 70 may capture the same point on a particular under-cowl component 66, such as the component of interest 95, from several angles, which may facilitate a 3-D temperature/thermal distribution map.

In some embodiments, each of the micro-IR cameras 70 may include a camera case 116 that is disposed about a respective one of the micro-IR cameras 70 and corresponding receptor(s) 108 and/or 110. The camera case 116 may be the outermost part of the micro-IR camera 70, and may insulate the micro-IR camera 70 from conditions in the annular cavity 64 of the gas turbine engine 40. For example, temperatures within the annular cavity 64 may exceed 500 degrees Fahrenheit, which may reduce an operational lifespan and/or accuracy of the micro-IR cameras 70, if not for the case 116. The camera case 116 may operate as a heat exchanger, and the cooling fluid may facilitate reducing a temperature of the micro-IR cameras 70 and enhance an operational life of the micro-IR cameras 70. As previously described, the cooling fluid may also be selectively targeted at certain under-cowl components 66 with high temperatures detected by the thermal monitoring system 38.

The camera case 116 in the illustrated embodiment may be additively manufactured, which may enable the camera case 116 to include an improved geometry of certain thermal management features (e.g., such as fins, cooling channels, etc.) which may not otherwise be included in the camera case 116 using conventional methods of manufacturing. Accordingly, the camera case 116 may be able to efficiently dissipate heat in the form of convective and/or radiative heat transfer. In certain embodiments, a flow of cooling fluid (e.g., cooling air) may be directed toward the camera case 116, and thus, absorb thermal energy from the camera case 116 and reduce a temperature of the camera case 116. In some embodiments, the cooling fluid may include bleed-off air, which is supplied from the fan assembly 41, the HPC 43, and/or the ECS valve 102. These and other cooling features are described in detail below.

A conduit 118, or plurality of conduits, may extend between the HPC (not shown) and the illustrated under-cowl cavity 66, such that the cooling fluid (e.g., air) may be directed across the camera cases 116 of the micro-IR cameras 70 and/or across certain under-cowl components 66. Additionally or alternatively, the cooling fluid may be supplied from any suitable pressurized fluid source, such as from a compressed air tank. It should be noted that the cooling fluid may not be limited to air, but can include any suitable cooling fluid, such as carbon dioxide, water vapor (e.g., steam), or the like. In some embodiments, the cooling fluid may be multi-phase, and include a gaseous and liquid mixture of fluid. For example, the conduit 118 may be used to supply a mixture of steam and liquid water vapor to certain of the camera cases 116, which may facilitate cooling of such camera cases 116. Further, as described below, cooling may be selectively applied to certain components, and/or during certain operating intervals, based on the output from the thermal monitoring system 38.

With respect to the temperature/thermal distribution map, the thermal monitoring system 38 may use the thermal measurements (e.g., surface temperature measurements) acquired by each of the micro-IR cameras 70, and may coordinate the data to arrange the thermal distribution map of the cavity 64 and the under-cowl components 66. In some embodiments, the temperature map (e.g., thermal distribution map) may correlate a particular surface temperature of the under-cowl components 66 to a predetermined spectral band or color spectrum. For example, surface temperatures within a first threshold range of temperatures may be illustrated in a first color on the thermal distribution map. Similarly, surface temperatures within a second threshold range of temperatures may be illustrated in a second color on the thermal distribution map.

In some cases, the thermal monitoring system 38 may be configured to generate a separate still frame (e.g., an image) of the thermal distribution map at a predetermined moment in time, where the still is indicative of a thermal distribution at the moment in time. For example, the thermal monitoring system 38 may generate a still frame thermal distribution map after every 0.5 seconds (sec.), 1 sec., 10 sec., 30 sec., or more seconds have elapsed. In some embodiments, the cameras 70 may include a sampling rate of up to 60 Hz. In other embodiments, the cameras 70 may include a sampling rate as low as 1-3 Hz. As described in greater detail herein, in some embodiments, the thermal monitoring system 38 may additionally or alternatively generate an animated thermal distribution map (e.g., a video animation) which illustrates transient surface temperature distributions across the under-cowl components 66, and over a period of time, such that the period of time can be analyzed to determine thermal trends during operation.

As discussed above, the thermal monitoring system 38 may be configured to generate an animated thermal distribution map (e.g., a video animation) illustrating transient surface temperature values of the under-cowl components 66. In some cases, the thermal monitoring system 38 may be configured to use the video animation (or still frames) to identify (e.g., actively or passively identify, via notification or the aforementioned color-coding map) and associate an occurrence of certain hot spots with a time vector. In other words, the thermal monitoring system 38 detect and/or store (e.g., in the memory device 80) local hot spots which occur, in particular, during transient operation of the gas turbine engine 40. For example, particular under-cowl components 66 (e.g. components substantially near the HPT 45 and/or the LPT 46) may experience relatively large thermal loads during initial startup of the gas turbine engine 40, prior to the gas turbine engine 40 operating within steady state conditions. In other words, these under-cowl components 66 may experience temperatures above the threshold temperature during transient operation of the gas turbine engine 40, however, may cool and operate within temperature ranges that are below the threshold temperature during steady state operation of the gas turbine engine 40. Over time, the controller 80 may be capable of determining expected thermal loading and preemptively cooling components before the temperature of those components exceeds a threshold. In other words, if the controller 80 determines that a particular component will become excessively hot a certain amount of time after start-up (e.g., based on past operation of the thermal monitoring system 38 with that turbine), the controller 80 may instruct or coordinate a cooling of the component in advance of the excessive heating of the component.

Figure 5:
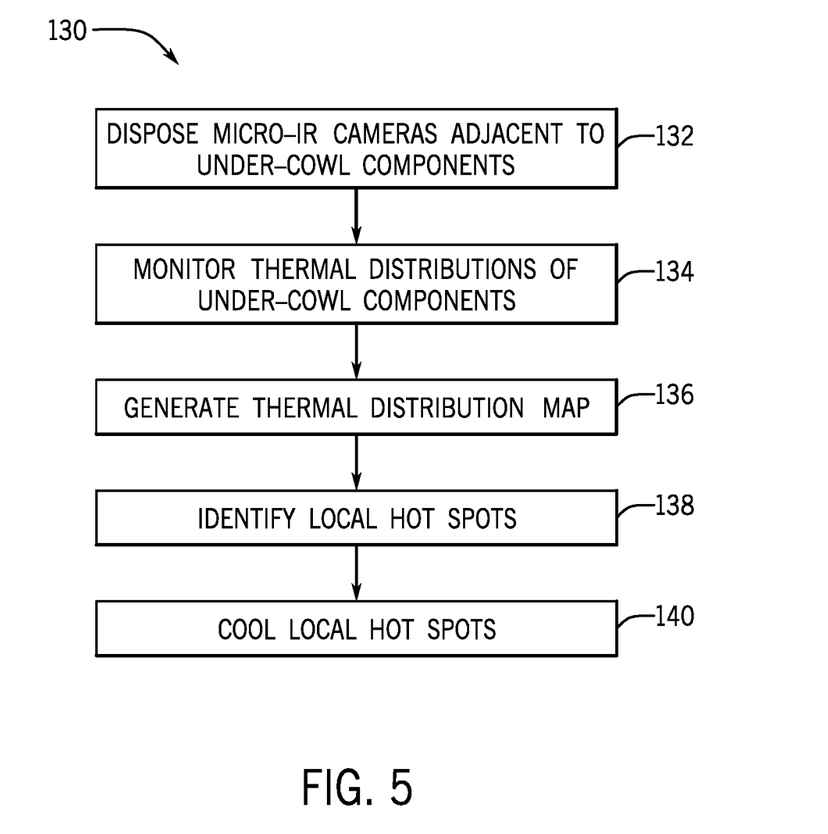
FIG. 5 is a block diagram illustrating an embodiment of a method of operating the thermal monitoring system of FIG. 1, in accordance with an aspect of the present disclosure.

FIG. 5 is a block diagram of an embodiment of a method 130 that may be used to operate the thermal monitoring system 38. The following discussion references element numbers used throughout FIGS. 1-4. The illustrated method 130 may including disposing (block 132) the micro-IR cameras 70 adjacent to certain of the under-cowl components 66 (e.g., the component of interest 95) within the annular cavity 64 (e.g., between the casing 54 and the cowl 62 of the gas turbine engine 40). In some embodiments, the micro-IR cameras 70 may be disposed individually throughout certain portions of the annular cavity 64 (e.g., such as the first micro-IR camera 88 and/or the second micro-IR camera 92). Additionally or alternatively, each micro-IR cameras 70 may be positioned and/or oriented such that the network of micro-IR cameras 70 detects the thermal radiation over a totality of a desired area. It should be noted that the thermal monitoring system 38 may include any suitable number of individual micro-IR cameras 70 that are disposed within the annular cavity 64. For example, the thermal monitoring system 38 may include 1, 2, 3, 4, 5, 10, 15, 20, or more individual micro-IR cameras 70.

In some cases, a density of the micro-IR cameras 70 (e.g., a quantity of micro-IR cameras observing a particular area) may be increased near certain portions of the casing 54 prone to relatively large thermal loading. As discussed above, it may be previously determined (e.g., via empirical tests and/or computer simulations) that a thermal load on certain portions of the casing 54 (e.g., portions of the casing 54 near the HPT 45 or the LPT 46) may be greater that a thermal load on other portions of the casing 54. Accordingly, the density of micro-IR cameras 70 may be increase near such a portion of the casing 54, such that under-cowl components 66 (including the casing 54) adjacent to this portion may be appropriately monitored by the thermal monitoring system 38.

With the above in mind, the thermal monitoring system 38 may use the micro-IR cameras 70 to monitor (block 134), or measure, thermal distributions of the under-cowl components 66. Specifically, the micro-IR cameras 70 may monitor a surface temperature of the under-cowl components 66 within a field of view 86 of the micro-IR cameras 70. As discussed above, each of the micro-IR cameras 70 may be communicatively coupled to the controller 78 of the thermal monitoring system 38, which may analyze (e.g., via the processor 76) and/or store (e.g., via the memory device 80) the acquired thermal data.

The thermal monitoring system may convert the data into surface temperature measurements and generate (block 136) a thermal distribution map, which may illustrate continuous surface temperature distributions of the under-cowl components 66. In some embodiments, the thermal distribution map may include a still frame image, which illustrates surface temperature distributions of the under-cowl components 66 at a particular instant in time. In other embodiments, the thermal monitoring system 38 may be configured to update the thermal distribution map in real-time (e.g., in a timeframe that is substantially close to the time of actual observation). In some embodiments, the temperature distributions of the under-cowl components 66 may be observed during transient operating conditions of the gas turbine engine 40 (e.g., via the video animation).

The thermal monitoring system 38 may identify (block 138) local hot spots within the thermal distribution map, which may be indicative of singularities of abnormally high temperature within, or adjacent to certain of the under-cowl components 66. The thermal monitoring system 38 may identify such components on the thermal distribution map by, for example, depicting such components in a particular color or hue. For example, components of which a surface temperature is below a threshold value may be illustrated on the thermal distribution map in a green color or hue, while components including a surface temperature above the threshold temperature may be illustrated in a red color or hue. Accordingly, the thermal distribution map may be used to detect and catalogue certain of the under-cowl components 66 which may experience thermal loads that are above the predetermined threshold value. In other embodiments, the measurements may be correlated with spectral bands used to generate the temperature map.

Further, the thermal monitoring system 38 (or a cooling system communicatively coupled with the thermal monitoring system 38) may cool (block 140) the local hot spots. For example, as previously described, a cooling fluid (e.g., compressed air bled from the compressor) may be selectively targeted at the local hot spots to cool the local hot spots.

Figure 6:
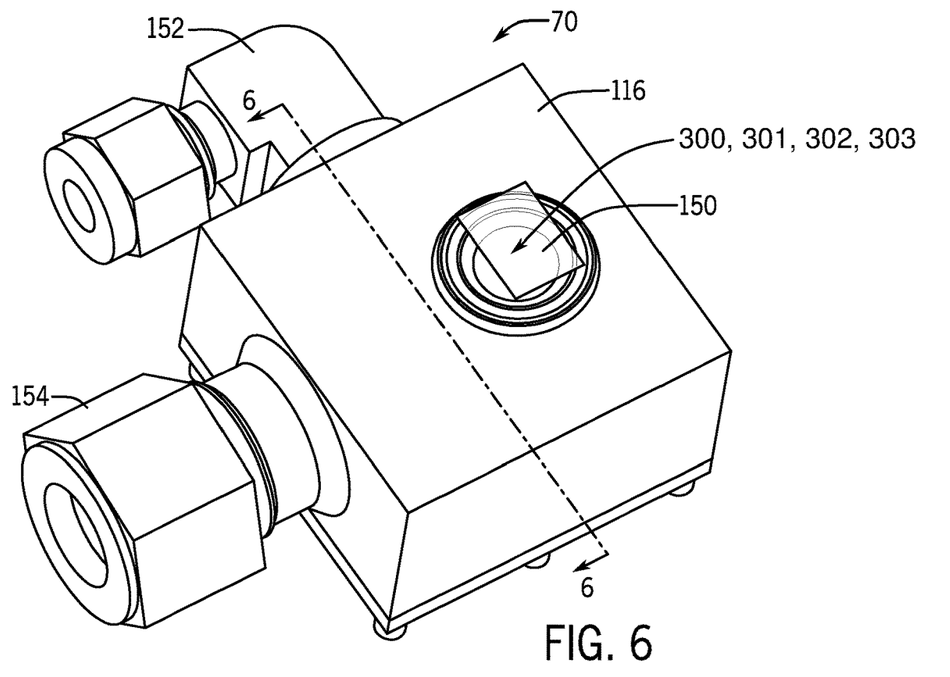
FIG. 6 is a perspective view of an embodiment of a micro-IR camera and corresponding camera case for use in the thermal monitoring system of FIG. 1, in accordance with an aspect of the present disclosure.
Figure 7:
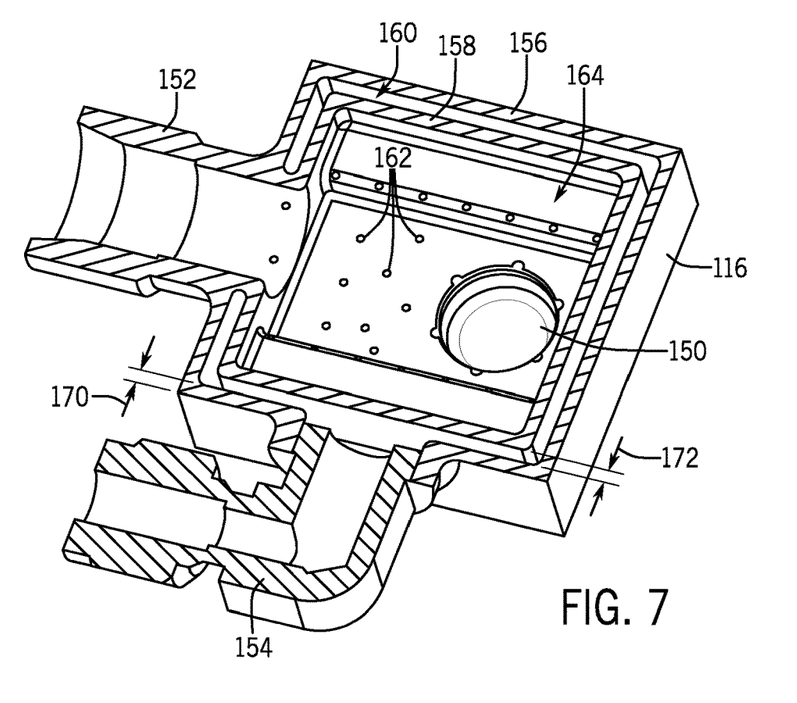
FIG. 7 is a cross-sectional perspective view of the camera case illustrated in FIG. 6, in accordance with an aspect of the present disclosure.

As noted above, presently disclosed embodiments may include cooling features for thermally managing the thermal monitoring system 38. That is, the thermal monitoring system 38 may be subject to thermal loads, and features of the cameras and/or an adaptive cooling system may be employed to manage the thermal loads. For example, FIG. 6 is a perspective view of one camera 70 (e.g., micro-IR camera) having an external camera case 116, as previously described. FIG. 7 is a cross-sectional perspective view of the camera case 116, taken along line 6-6. The camera case 116 includes a window 150 through which the camera 70 detects the thermal radiation. That is, a lens, sensory array, and/or optical filter of the camera 70 may be directed to monitor through the window 150.

The camera case 116 may include a first port 152 and a second port 154, where the first and second ports 152, 154 are configured to facilitate fluid flow (e.g., air flow) through the camera case 116. In one embodiment, the first port 152 may be an inlet to the camera case 116, and the second port 154 may be an outlet from the camera case 116. In another embodiment, the first port 152 may be the outlet from the camera case 116, and the second port 154 may be the inlet to the camera case 116. The ports 152, 154 may include integral extensions of the camera case 116, although in certain embodiments, separate components (e.g., nuts, washers, gaskets, etc.) may be fitted over the integral extensions. In some embodiments, the ports 152, 154 may be entirely detachable from the camera case 116. In general, the ports 152, 154 facilitate fluid flow through the camera case 116, as described in detail below. As shown, a lens 300, a mirror 301, an optical filter 302, and a sensor array 303 may be disposed within the camera case 116 and oriented such that the lens 300, mirror 301, optical filter 302, and sensor array 303 can detect the thermal radiation.

Focusing on FIG. 7, the camera case 116 may include an outer wall 156 and an inner wall 158, with an air gap 160 between the outer wall 156 and the inner wall 158. Cooling holes 162 in the inner wall 158 of the camera case 116 may fluidly couple the air gap 160 with an interior 164 of the camera case 116, where the interior 164 is configured to house the camera's imaging components. As shown, the port 152 is fluidly coupled with the interior 164 of the camera case 116, while the port 154 is fluid coupled with the air gap 160. Thus, fluid may enter the camera case 116 through either port 152, 154, may pass through the cooling holes 164 in the internal wall 158 of the camera case 116, and may pass through the other of the ports 154, 152 to exit the camera case 116. The cooling holes 164 in the illustrated embodiment may be between 0.005 inches and 0.015 inches (e.g., 0.010 inches). The walls of the camera case 116 may include a thickness 170 between 0.050 inches and 0.075 inches (e.g., 0.0625 inches). The air gap 90 may include a thickness 172 of between 0.050 inches and 0.075 inches (e.g., 0.0625 inches).

Figure 8:
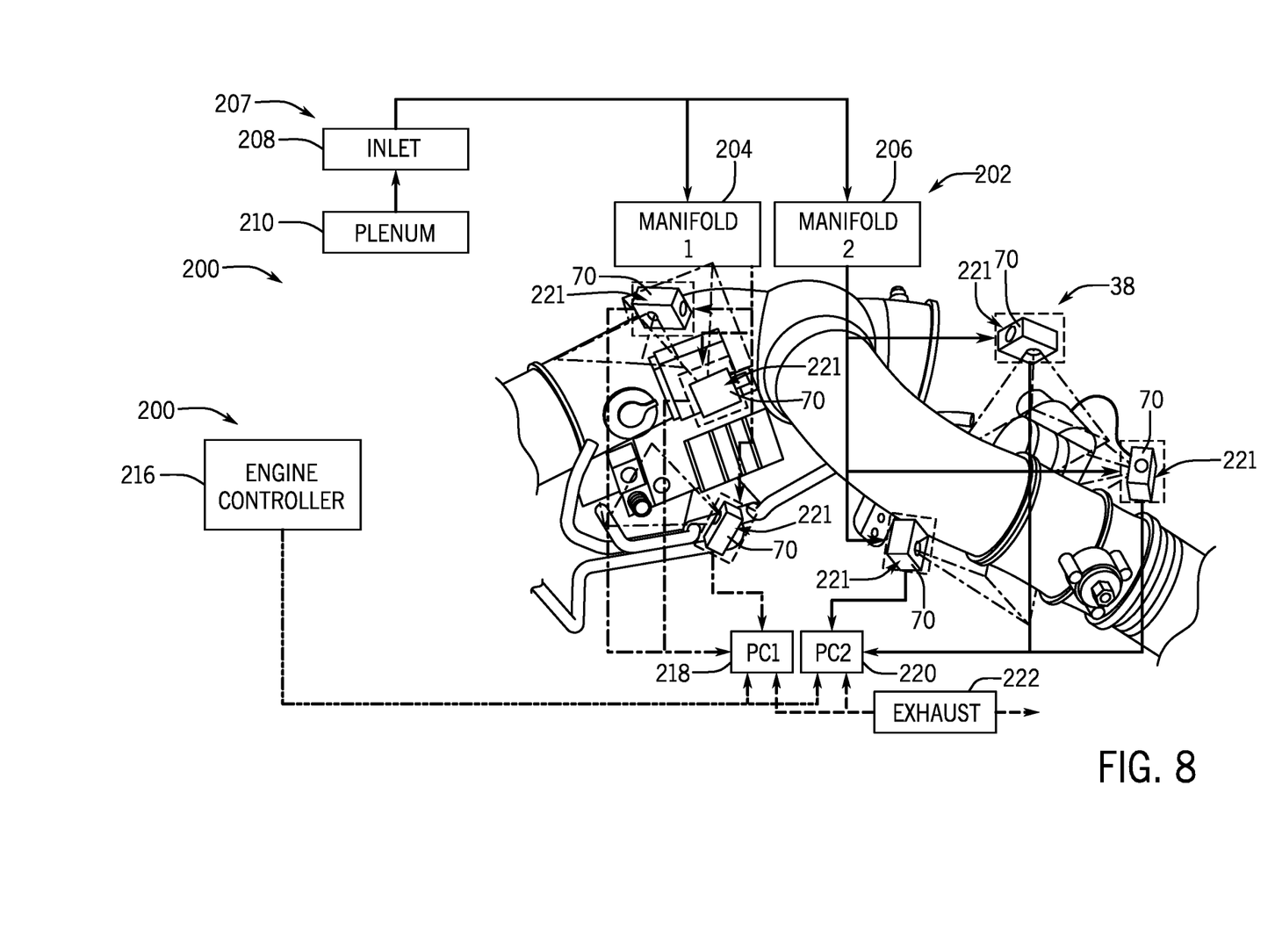
FIG. 8 is a schematic illustration of an embodiment of a thermal management system for cooling the micro-IR cameras of the thermal monitoring system of FIG. 1, in accordance with an aspect of the present disclosure.

FIG. 8 is a schematic illustration of an embodiment of a thermal management system 200 for cooling the micro-IR cameras 70 of the thermal monitoring system 38. That is, the thermal monitoring system 38 illustrated in FIG. 8 includes the cameras 70, which may include the camera cases 116 (and corresponding cooling features) of FIGS. 6 and 7.

In FIG. 8, each of the cameras 70 is fluidly coupled with an intake 202 having a first manifold 204 and a second manifold 206. For example, the first manifold 204 may be fluidly coupled with three cameras 70 disposed in a first area, and the second manifold 206 may be fluidly coupled with three cameras 70 disposed in a second area different than the first area. The manifolds 204, 206 are fluidly coupled with a cooling fluid supply source 207 (e.g., an air supply source). The cooling fluid supply source 207 may include a fan of the engine, as previously described, in addition to other features. For example, the air supply source 207 may include a plenum 210 (e.g., between an inner cowl and outer cowling of the engine) and an inlet 208 (e.g., through the inner cowl and into the under-cowl cavity 64). The cooling fluid (e.g., air) may be distributed from the air supply source 207 to the manifolds 204, 206, to the cameras 70 (or cases thereof), and to exhaust 222. The manifolds 204, 206 may be disposed within the cavity 64, or within the plenum 210. In some embodiments, the cowl may include multiple inlets, such as the same number of inlets as cameras 70, whereby each inlet corresponds with one camera 70 and no manifolds are included. It should be noted that the fluid passageways between the manifolds 204, 206 and the exhaust 222 may be in a closed loop, meaning the fluid is controllably directed via closed passageways into and out of the cavity.

The thermal management system 200 also includes an engine controller 216 and two embedded processors 218, 220, although it should be noted that the processing described below could be carried out by a different arrangement of control components. In the illustrated embodiment, the cameras 70 may include sensors 221 configured to detect cooling flow pressure at least at an inlet to the camera 70, and cooling air temperature at the inlet to the camera 70, within the interior of the camera 70, and at an exit from the camera 70. The cooling passages and electrical passages from the cameras 70 may be combined to reduce a part count of the system. That is, the electric wiring may be insulated from, and/or housed within or attached to, the passages carrying the cooling air from the air intake 204 to the cameras 70 and to the exhaust 222.

The sensors 221 may be communicatively coupled with the embedded processors 218, 220, which monitor the above-described pressures and temperatures, and relay data indicative of the pressures and temperatures to the engine controller 216. The engine controller 216 may control the air supply source 207, the air manifolds 204, 206 of the air intake 202, and/or the exhaust 222 to adjust the air pressure to maintain constant camera temperatures. In other words, the embedded processors 218, 220 and the engine controller 216 may receive the sensor feedback, and may control the cooling flow based on the sensor feedback, to maintain constant camera temperature, which improves the reliability of thermal monitoring results, improves the integrity of the cameras, and improves the durability of the thermal monitoring system 38.

Technical effects of the invention include improved thermal monitoring of certain turbine components, particularly of under-cowl components of a gas turbine engine. For example, by monitoring surface temperature distributions of the under-cowl components, local hot spots and/or regions of abnormal temperature within the under-cowl components may be detected. Accordingly, a thermal management architecture of certain of the under-cowl components may be adjusted such that these components may be cooled more effectively. In addition, thermal abnormalities occurring during transient operation of the gas turbine engine may be detected and catalogued, such that the thermal management architecture may be adjusted to specifically cool these components during such transient conditions. Accordingly, the thermal monitoring system may enable undesirable creep, oxidation, wear, and thermal fatigue of the under-cowl components to be mitigated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine engine, comprising:
a core engine having a casing;
a cowl disposed annularly around the casing such that a gap is formed between the casing and the cowl; and
a thermal monitoring system having at least one camera positioned within the gap, wherein the at least one camera is configured to detect thermal radiation from at least one turbine component within the gap.

2. The gas turbine engine of claim 1, wherein the at least one camera comprises an infrared (IR) camera configured to detect the thermal radiation from the at least one turbine component.

3. The gas turbine engine of claim 1, wherein the at least one camera comprises a window, a lens, a mirror, an optical filter, and a sensor array, and wherein the at least one camera is positioned and oriented such that the window, the lens, the mirror, the optical filter, and the sensor array is pointed toward at least one component of interest of the at least one turbine component.

4. The gas turbine engine of claim 1, wherein the at least one camera is configured to monitor the thermal radiation from the at least one turbine component during operation of the gas turbine engine.

5. The gas turbine engine of claim 1, comprising:
a thermal management system having an engine controller, a cooling fluid supply source, and at least one sensor configured to detect a pressure of a cooling fluid adjacent or within the at least one camera, a temperature of the cooling fluid adjacent or within the at least one camera, or both;

wherein the engine controller is configured to receive data indicative of the pressure, the temperature, or both from the at least one sensor, and to control a flow of the cooling fluid from the cooling fluid supply source based on the data indicative of the pressure, the temperature, or both.

6. The gas turbine engine of claim 1, wherein the thermal monitoring system comprises a controller communicatively coupled to the at least one camera, and wherein the controller is configured to coordinate data received from the at least one camera to generate a temperature map of the at least one turbine component.

7. The gas turbine engine of claim 6, comprising a display communicatively coupled with the controller, wherein the controller is configured to output the temperature map to the display, wherein the temperature map utilizes two or more spectral bands correlated to the data.

8. The gas turbine engine of claim 1, wherein the at least one camera comprises an additively manufactured camera case.

9. The gas turbine engine of claim 8, wherein the additively manufactured camera case comprises at least one of the following:
a height between 0.2 inches to 2 inches;
a width between 0.2 inches to 2 inches; or
a length between 0.2 inches to 2 inches.

10. The gas turbine engine of claim 8, comprising a flow path configured to direct a cooling fluid toward the additively manufactured camera case, wherein the cooling fluid comprises air, water, oil, fuel, or any combination thereof.

11. A method of monitoring a thermal distribution in a turbine system, comprising:
measuring, via one or more infrared (IR) cameras, thermal radiation from at least one under-cowl component disposed in a gap between a casing of the turbine system and a cowl of the turbine system;
converting the data indicative of the thermal radiation of the at least one under-cowl component into a surface temperature measurement of the at least one under-cowl component; and
generating, via a controller and based on the surface temperature measurement of the at least one under-cowl component, a temperature map of the at least one under-cowl component.

12. The method of claim 11, wherein the one or more IR cameras comprises two or more IR cameras.

13. The method of claim 11, comprising:
determining at least one component of interest from the at least one under-cowl component; and
positioning and orientating the one or more IR cameras such that a window, a lens, a mirror, an optical filter, and a sensor array of the one or more IR cameras is pointed toward the at least one component of interest.

14. The method of claim 11, comprising:
correlating the surface temperature measurement into two or more spectral bands; and
generating the temperature map utilizing the two or more spectral bands.

15. The method of claim 11, comprising measuring, via the one or more infrared (IR) cameras, the thermal radiation at a sampling rate of between 1 Hertz (Hz) and 60 Hz.

16. An in situ thermal monitoring system of a turbine engine, comprising:
two or more infrared (IR) cameras configured to detect thermal radiation of at least one turbine component disposed within a gap between a casing of the turbine engine and a cowl of the turbine engine; and
at least one processor, wherein the at least one processor is configured to receive data from the two or more IR cameras indicative of the thermal radiation of the at least one turbine component, to convert the data indicative of the thermal radiation into downstream data indicative of surface temperatures of the at least one turbine component, and to analyze the downstream data to generate a temperature map illustrating the surface temperatures of the at least one turbine component.

17. The in situ thermal monitoring system of claim 16, wherein the at least one processor comprises:
a first processor of a first IR camera of the two or more IR cameras; and
a second processor of a second IR camera of the two or more IR cameras.

18. The in situ thermal monitoring system of claim 16, wherein a first IR camera of the two or more IR cameras comprises a camera case configured to:
hold an IR window, an IR lens, an IR optical filter, and an IR camera;
protect the first IR camera from thermal exposure; and
receive a cooling fluid and protect components of the first IR camera from an environment.

19. The in situ thermal monitoring system of claim 16, wherein a first IR camera case of the two or more IR cameras comprises at least one of the following:
a height between 0.2 inches and 2 inches;
a width between 0.2 inches and 2 inches; or
a length between 0.2 inches and 2 inches.

20. The in situ thermal monitoring system of claim 16, comprising a display communicatively coupled with the at least one processor, wherein the at least one processor is configured to output the temperature map on the display.

* * * * *